United States Patent [19]

Mulfeld

[11] 4,418,995
[45] Dec. 6, 1983

[54] MODULE FOR PROJECTING MOTION PICTURES THROUGH A CAMERA

[76] Inventor: Stanley Mulfeld, 240 E. 76th St., New York, N.Y. 10021

[21] Appl. No.: 295,718

[22] Filed: Aug. 24, 1981

[51] Int. Cl.³ .............................................. G03B 21/00
[52] U.S. Cl. ..................................... 352/129; 352/138
[58] Field of Search ........................ 352/129, 136, 138

[56] References Cited

U.S. PATENT DOCUMENTS 2,883,904  4/1959  De Rose ............................... 352/136
3,264,051  8/1966  Melton ................................. 352/129
4,179,199 12/1979  Land .................................... 352/138

*Primary Examiner*—Monroe H. Hayes
*Attorney, Agent, or Firm*—kane, Dalsimer, Kane, Sullivan and Kurucz

[57] ABSTRACT

A module for projecting motion pictures through a standard camera having an independently powered illumination source disposed within a standard film cartridge body having a pair of arms, one arm for mounting a film supply reel and the other for mounting a film take-up reel; and a film transport means driven off the camera film drive.

5 Claims, 7 Drawing Figures

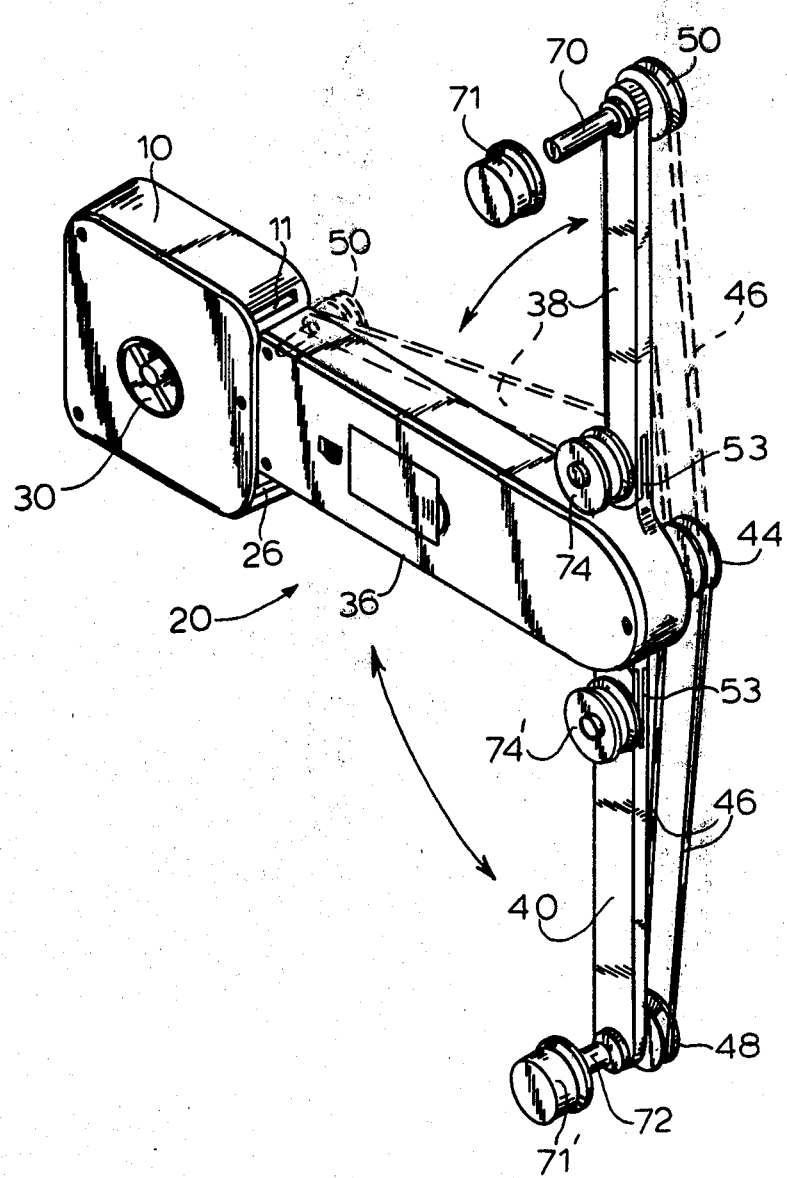

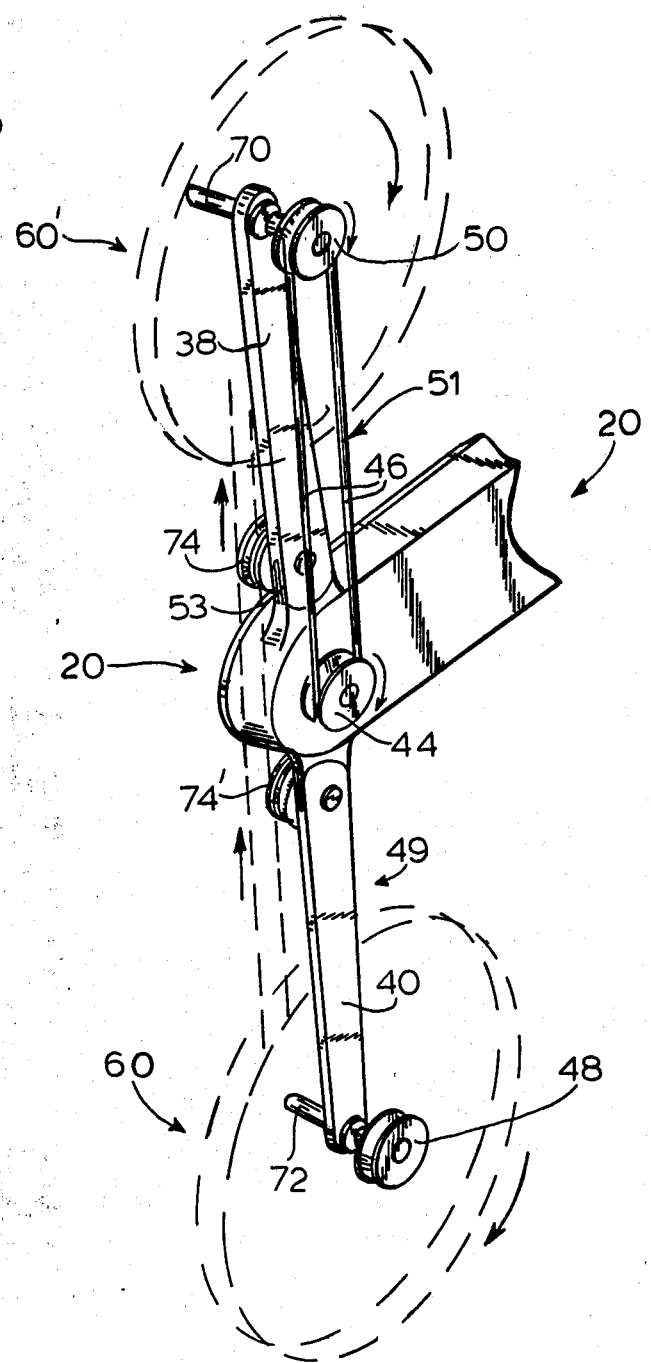

MODULE FOR PROJECTING MOTION PICTURES THROUGH A CAMERA

BACKGROUND OF THE INVENTION

This invention relates new and useful improvements in apparatus for taking and projecting motion pictures particularly means for projecting motion pictures with modern movie cameras that use standard films supplied in cartridges, cassettes, magazines and the like, for example, Kodak super eight cartridge films.

The advantages of an apparatus capable of both taking and projecting motion pictures have long been recognized in the art. The prior art concepts of such camera-projector devices involve specially constructed or modified cameras provided with film transport and illumination means for projecting through the camera optics or separate projection optics, for example, U.S. Pat. Nos. 3,029,684; 2,883,904; and 1,624,103. Such devices are mechanically complex and consequently expensive to manufacture and maintain. Another disadvantage of many prior art motion picture camera-projectors is the increased bulk and weight resulting from all or part of the projection means being permanently attached to the camera means.

SUMMARY OF THE INVENTION

The present invention obviates the above and other disadvantages of the prior art and produces new and useful advantages by providing a mechanically simple module adapted for use with conventional cartridge loading movie cameras. Specifically, the present invention provides a modular projection means having an independently powered illumination source disposed within a standard film cartridge body having a pair of arms, one arm for mounting a film supply reel and the other for mounting a film take up reel. The arms are so arranged that they do not interfere with the positioning of the projection module standard film cartridge body in a conventional camera's film recess. The projection module film transport is driven off the camera film drive hence no separate drive means is required.

It is an object of the present invention to provide a projection module capable of converting a conventional motion picture camera into a motion picture projector.

It is a further object of the present invention that the aforementioned projection module be operable with minimum, if any, modifications of the camera.

It is a further object of the present invention that the projection module be foldable for easy storage.

It is a further object of the present invention that the projection module be mechanically simple, easily manufactured and operated.

With the above and other incidental objects in view as will more fully appear in this specification, the invention intended to be produced by Letters Patent consists of the features of construction, the parts and combinations thereof and the mode of operation as hereinafter described or illustrated in the accompanying drawings, or their equivalents.

Referring to the accompanying drawings wherein are shown two but not necessarily the only forms of embodiment of the present invention.

BRIEF DESCRIPTION OF THE DRAWINGS

FIG. 4, is a perspective view of the present invention in the play mode.

FIG. 5, is a fragmentary perspective view of the present invention in the rewind mode.

DESCRIPTION OF THE PREFERRED EMBODIMENT

Figure 1:
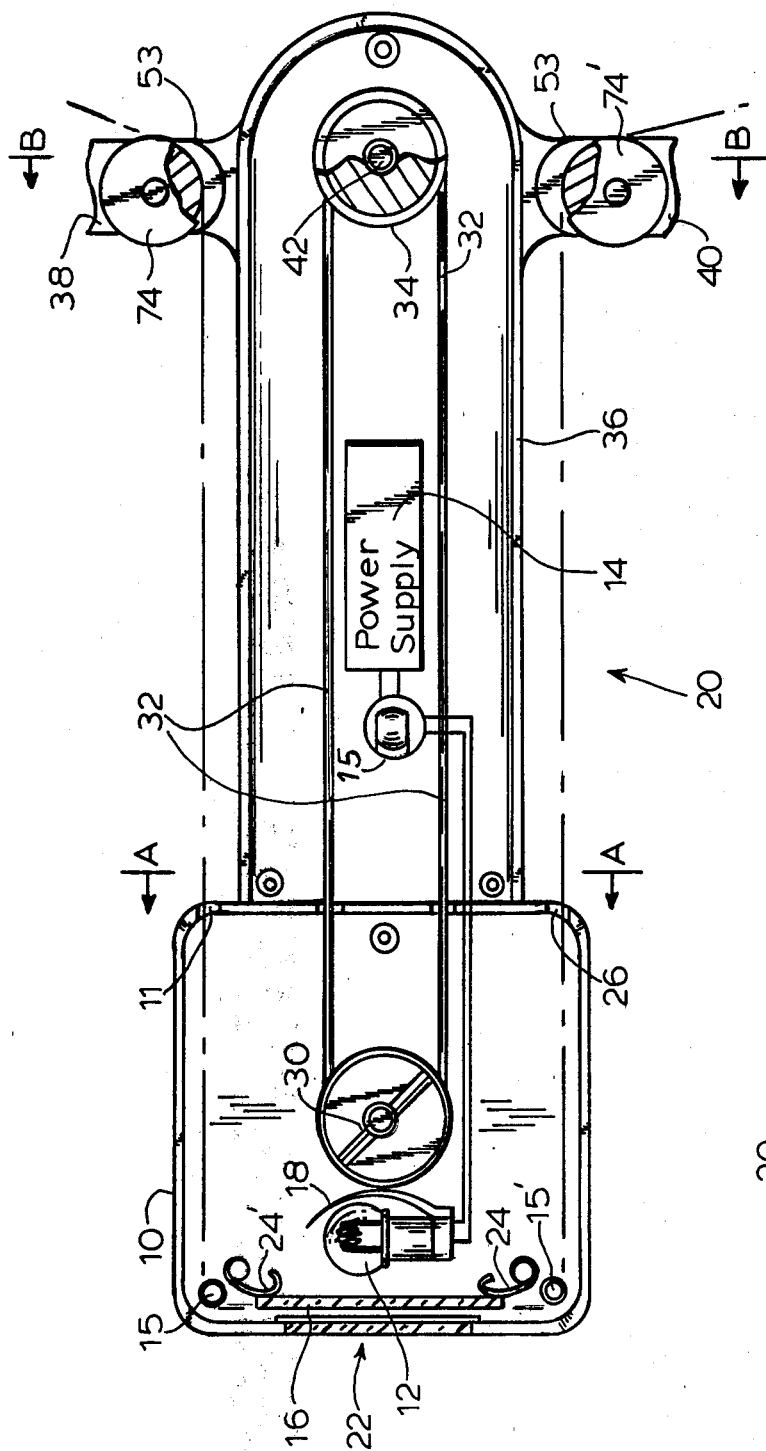
FIG. 1, is a fragmentary plan view of the preferred embodiment of the present invention.
Figure 3:
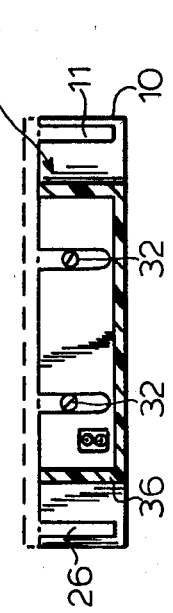
FIG. 3, is a fragmentary plan rear view of the take-up and supply reels drive assembly along lines A—A.

Details of the preferred embodiment are shown in FIG. 1. Standard film cartridge body 10 also referred to herein as lamp housing is provided with projection lamp 12 powered by an internal power system 14, for example, batteries and a switch means 15 for turning the lamp on and off. It is understood that an alternative power system utilizing any source of electricity may be readily adapted to the present invention. When in use, the illumination of lamp 12 is focused upon light transmissive pressure plate 16 by reflector 18 and thereafter through film 20 and into the camera optical system as is apparent from FIG. 6. All or a portion of the light transmissive pressure plate 16 may made of a transparent material or an opaque material with an opening or light transmissive portion aligned with opening 22 in lamp housing 10. Tensioning springs 24 and 24' urge pressure plate 16 in proper alignment with opening 22 thereby maintaining proper orientation of film 20 during the projection operation.

Film bearing the images intended to be projected are transported through the projection module and lead between pressure plate 16 and opening 22 by a system of reels, pulleys and guides, as hereinafter described, driven by the cameras own film transport mechanism.

Figure 2:
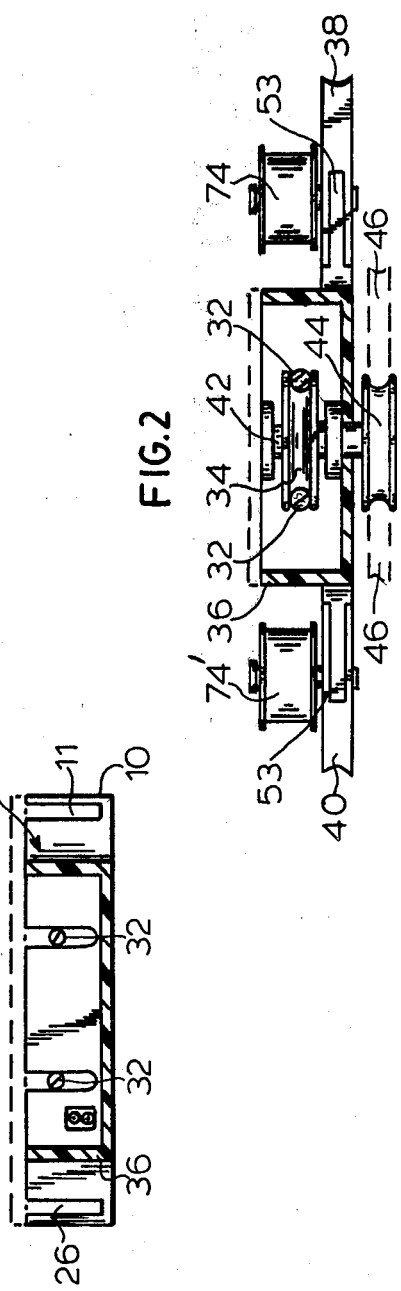
FIG. 2, is a fragmentary plan view of the rear of lamp housing along lines B—B.

Slotted camera drive engagement 30 is rotated by the camera drive mechanism (not shown) as in the normal photographing operation. Main drive belt 32 transmits this movement to internal pulley 34 positioned at the rear portion of drive housing 36 in the vicinity of supply and take-up arms 38 and 40 respectively. Internal pulley 34 is attached to spindle 42 which is rotatably journaled in housing 36 and communicates the rotational motion imparted by main drive belt 32 to auxiliary drive pulley 44 as shown in FIG. 2. Removable auxiliary drive belt 46 further communicates the motion of the main drive belt to either take-up reel pulley 48 in the play mode or supply reel pulley 50 when in the rewind mode as shown in FIGS. 4 and 5. The auxiliary drive belt 46 is manually moved from supply reel drive pulley 50 to the take-up reel drive pulley 48 or vice versa to change the operational mode between rewind to play. The supply reel pulley 50 and take-up reel pulley 48 are rotatably mounted on supply and take-up arms 38 and 40, respectively. A hinge 53 as shown in FIG. 4 or other movable joint may be provided to make arms 38 and 40 collapsible for convenient storage of the projection module. The film path and reels are shown by dotted lines in FIG. 5 to illustrate the reels 60 and 60', direction of rotation and show that in the rewind mode film 20 passes behind the drive housing 36 rather than through the lamp housing 10 as in the play mode.

Figure 6:
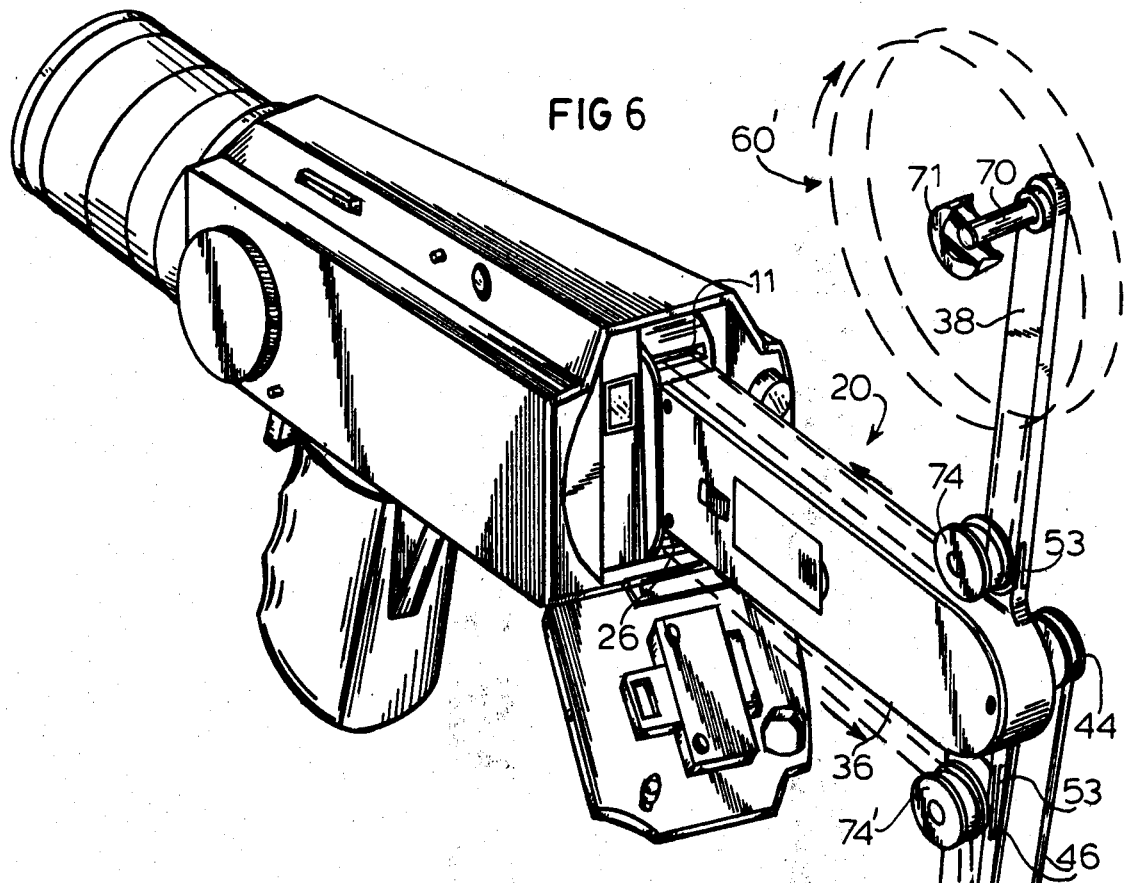
FIG. 6, is a perspective view of the present invention mounted in a conventional rear loading motion picture camera.

When the projection module is engaged with a motion picture camera and operating in the play mode as illustrated in FIG. 6, film 20 is drawn from reel 60', both shown by broken lines. In this mode, reel 60' is secured by fastener 71 and rotates freely with spindle 70 in the direction shown by the curved arrow as film 20 is drawn over rotatable guide 74 into the lamp housing 10 through film entry opening 11 passing over guide 15 and between pressure plate 24 and opening 22 so that light of lamp 12 passes through film 20 into the optical system of the camera thereby projecting images recorded on the film 20. Thereafter, the film 20 passes over guide 15' out of lamp housing 10 through exit opening 13 and over rotatable guide 74' to be collected on take-up reel 60 that is secured to spindle 72 by fastener 71'. Auxiliary drive belt 46 is positioned between reel drive pulley 44 and take-up drive pulley 48 causing reel 60 to rotate in the direction of the curved arrow FIG. 6 pulling film 20 through the projection module.

Figure 7:
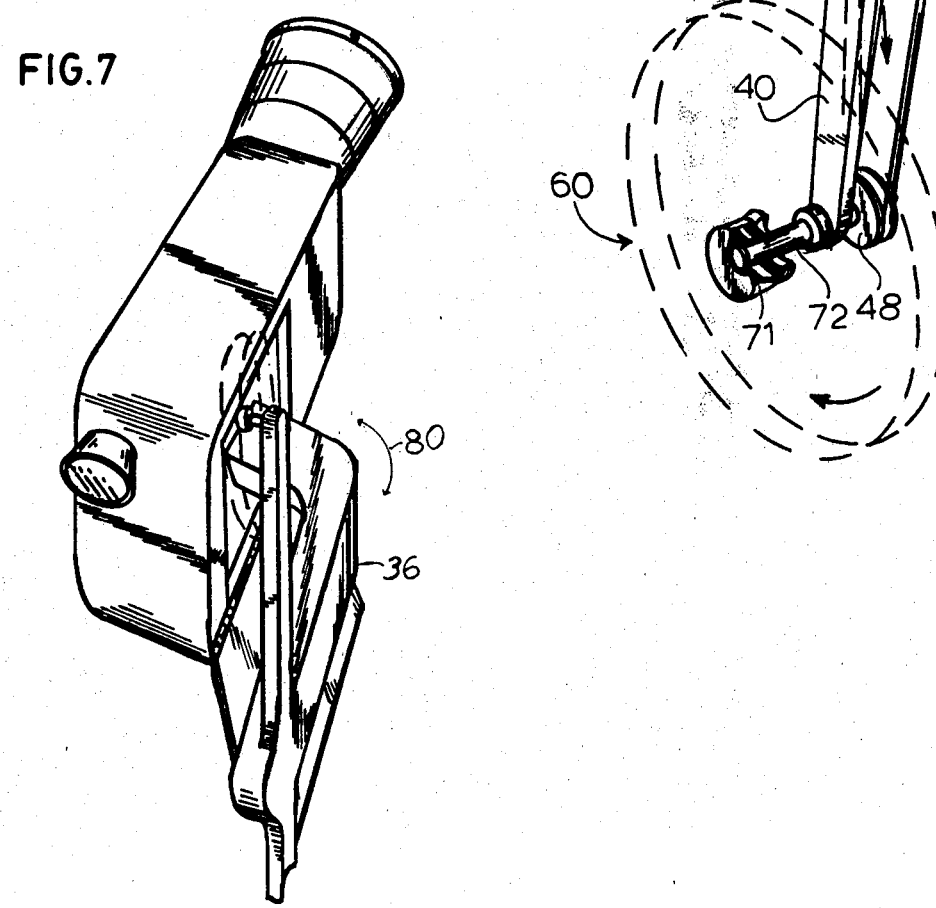
FIG. 7, is a perspective view of an alternate embodiment of the present invention for use with a conventional side loading motion picture camera.

FIG. 7, illustrates an alternate embodiment of the projection module wherein the drive housing is angularly displaced to accommodate conventional sideloading cameras.

In this embodiment the drive housing 36' has a curved portion 80. The other elements such as arms pulleys etc. are repositioned to accomodate the modified film path required by side loading cameras.

While in order to comply with the statute the invention has been described language more or less specific as to structural features, it is to be understood that the invention is not limited to the specific features shown, but that the means and construction herein disclosed comprise but one of several modes of putting the invention into effect, and the invention is therefore claimed in any fo its forms or modifications within the legitimate and valid scope of the appended claima.

What is claimed is:

1. An apparatus for projecting motion pictures with a standard motion picture camera, which comprises:
    a lamp housing which fits within a standard motion picture camera film recess having a light transmissive portion that aligns with the camera optical system when the lamp housing is inserted into the camera;
    an illumination means, disposed within the lamp housing so that light emitted therefrom passes through the light transmissive portion of the lamp housing into the camera optical system; and
    a film transport means comprising
    a camera drive engagement whereby the camera's film drive is connected to a main drive pulley within the lamp housing;
    a drive housing extending from the lamp housing having an auxiliary drive pulley mounted on a rotatable spindle within the drive housing, the rotatable spindle having an end portion extending to the drive housing exterior and a reel drive pulley mounted on the exterior portion of the rotatable spindle;
    a main drive belt within the drive housing connecting the main drive pulley and the auxiliary reel drive pulley;
    a supply reel arm extending from the drive housing having a supply reel pulley mounted on a rotatable spindle for receiving a film supply reel;
    a take-up reel arm extending from the drive housing having a take-up reel pulley mounted on a rotatable spindle for receiving a take-up reel; and
    an auxiliary drive belt that may be manually attached between the reel drive pulley and either the take-up reel pulley or supply reel pulley depending on the desired mode of operation.

2. An apparatus as recited in claim 1 wherein the illumination means is an electric lamp powered by a battery disposed within the drive housing.

3. An apparatus as recited in claim 1 wherein the light transmissive portion of the lamp housing that aligns with the camera's optical system when inserted into the camera film recess is a pressure plate having a transparent portion and a means for urging it toward an opening in the lamp housing in such manner that film passing therebetween is properly oriented for projection through the camera optical system.

4. An apparatus as recited in claim 3 wherein the standard motion picture camera is a rear loading type.

5. An apparatus as recited in claim 2, 3, 4, or 1 wherein the standard motion picture camera uses standard super eight size film.

* * * * *